Jan. 11, 1966 C. W. BARRON 3,229,082
ADJUSTABLE VEHICLE HEADLIGHTS
Filed April 8, 1964
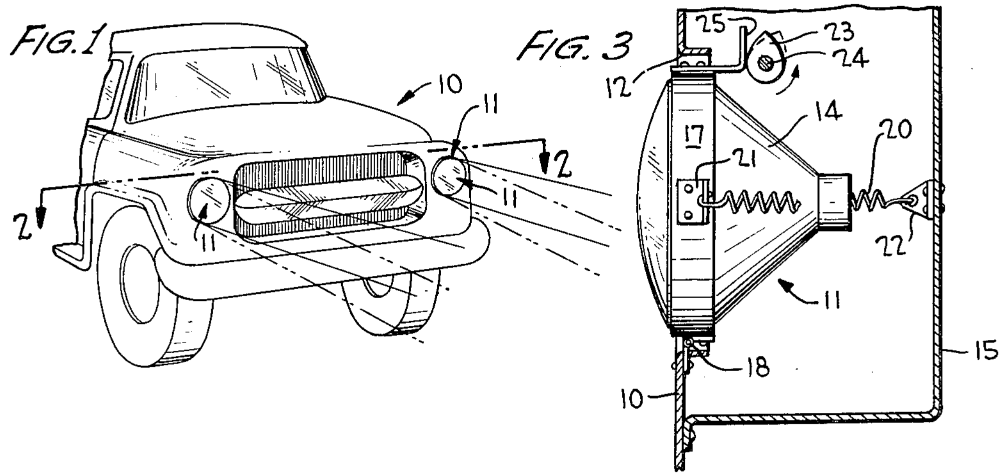
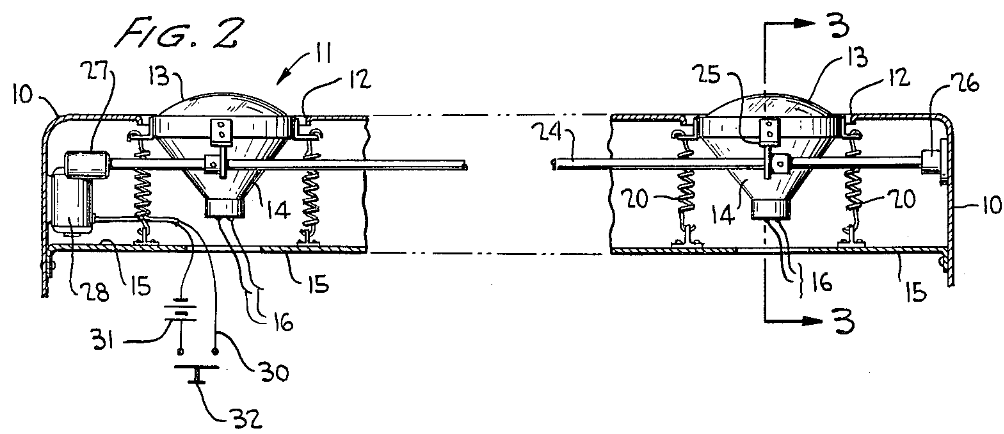
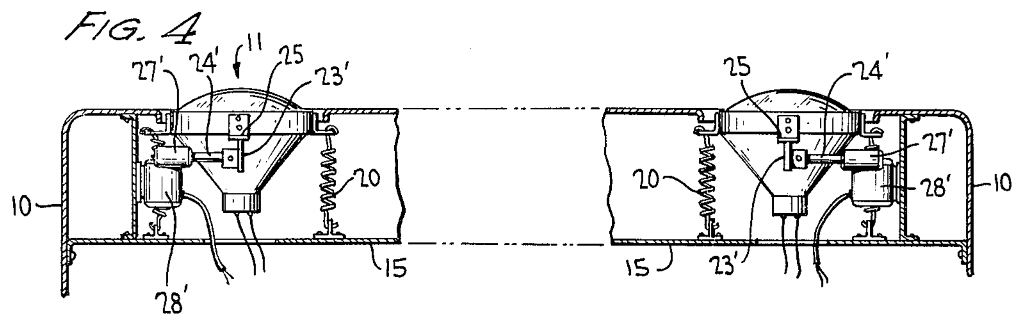
INVENTOR,
CHESTER BARRON
BY Watson, Cole, Grindle & Watson
ATTORNEYS United States Patent Office 3,229,082

Patented Jan. 11, 1966

3,229,082

ADJUSTABLE VEHICLE HEADLIGHTS

Chester W. Barron, R.F.D. 1, Cornelia, Ga. 30531

Filed Apr. 8, 1964, Ser. No. 358,180
3 Claims. (Cl. 240—7.1)

This invention relates to improvements in vehicle headlights and more particularly to an improved means for effecting angualr adjustments of the light structures.

The invention finds particular utility in connection with truck headlights. The usual sealed beam headlights with which trucks are normally equipped are mechanically adjusted to fixed positions in which their high beams are at the desired maximum elevations. The switching of the lights from high to low beam is accomplished in conventional manner by a foot controlled dimmer switch. Such mechanical adjustment however is generally made when the truck is empty. Therefore when the truck is subsequently loaded, the weight on its rear produces an elevation of the front end of the truck so that the beams of its headlights are correspondingly elevated to such an extent that even actuation of the dimmer switch to lower beams will still result in their being so elevated as to blind oncoming motorists.

In accordance with the present invention the headlights are so arranged that they may be physically or mechanically angularly adjusted to bring their high beams to the desired safe maximum level regardless of the degree of loading of the truck. Thus in accordance with the invention the headlights are hingedly mounted for angular adjustment about laterally aligned axes at the front end of the vehicle and are urged resiliently in a given angular direction by suitable spring means. For adjusting the headlights there are provided rotary cams which, in the preferred embodiment of the invention, are fixed to a common cam shaft for operative engagement with suitable followers affixed to the respective headlights in a manner to angularly adjust the respective headlights in opposition to said resilient means.

Angular adjustment of the cam shaft to effect the desired adjustments of the lights preferably is effected through a small electric motor having a reduction gear drive to the cam shaft so that, when energized, the motor will unidirectionally rotate the cam shaft at a comparatively slow speed. Actuation of the motor to control its energizing and deenergizing may be through a conventional electric circuit controlled by a suitably located manual switch on the dashboard or elsewhere in the truck cab. The reduction gearing between the motor and the cam shaft, in addition to slowing down the cam shaft rotation to facilitate its angular adjustment, will serve when the motor is stopped to maintain the cam shaft in its desired position of angular adjustment. The cams may be shaped to have somewhat different profiles or to be relatively angularly out of phase with each other to whatever extent may be desired to vary the relative elevations of the headlights, having in mind for instance that it is often desirable to lower the beam of one light to a greater extent than that of the other in passing other vehicles.

In a modified form of the invention, independent adjustment of the respective headlights is achieved through the use of separate cam shafts for the respective lights, each having its own driving motor, reduction gearing and control switch.

The foregoing as well as other features and advantages will be apparent from the following detailed description considered in conjunction with the accompanying drawings in which:

FIGURE 1 is an elevational view of the front end of a conventional truck with the headlights applied thereto in accordance with the invention, the high beams of light from the said headlights being shown in full lines in their raised positions and broken lines in their depressed or lowered condition as caused by bodily angular adjustment of the respective headlights.

FIGURE 2 is a greatly enlarged sectional view through the said headlights and the adjacent truck or vehicle structure, on the line 2—2 of FIGURE 1.

FIGURE 3 is a still further enlarged vertical section through one of the headlights taken on the line 3—3 of FIGURE 2 showing in phantom how one of the cams may be angularly displaced from the other cam; and FIGURE 4 is a view similar to FIGURE 2 illustrating a modified form of the invention.

The accompanying drawing and following detailed description are exemplary only, but will serve to disclose what is presently contemplated as the best mode of practicing the invention. Such disclosure of course will involve details which may be omitted or changed as those skilled in the art will understand without departing from the spirit of the invention.

Thus referring now in detail to the drawings, and first considering the preferred embodiment illustrated in FIGURES 1, 2 and 3, the numeral 10 generally designates the front end portion of the body (hereinafter sometimes referred to as the "body member") of a conventional motorized vehicle in the form of a truck. The headlights 11—11 are respectively supported through openings 12 (as best seen in FIGURES 2 and 3) in the sheet metal body structure, so that only the forwardly directed lenses 13 of the respective headlights are visible from the front of the vehicle, the main body portion 14 of each such light being housed preferably within a casing 15 affixed to the vehicle body rearwardly of the openings 12.

The headlights 11 (hereinafter sometimes called "headlight members") are of the conventional sealed beam type having electrical circuits 16 so arranged that under the control of a conventional foot actuated dimmer switch (not shown) the respective lights may be selectively changed back and forth between high and low beam.

In the illustrated embodiment, each light 11 is mounted in and carried entirely by an encircling frame or rim 17 which, at its bottom, is hinged to the vehicle body 10 just below the opening 12, for angular adjustment about a horizontal axis defined by the pintle 18 of its hinge. Normally the axes 18—18 defined by the hinges will be in alignment with each other.

Resilient means for urging each such headlight 11 in a given angular direction about its axis 18 is exemplified by the tension springs 20, it being apparent from FIGURES 2 and 3 that each such spring 20 is tensioned between a bracket 21 affixed to the encircling supporting frame 17 of its respective headlight eccentrically to axis 18, and a further bracket 22 affixed to the vertical rear wall of the casing 15.

In the instant embodiment the arrangement is such that the springs 20 urge the respective headlights 11 angularly in the same given direction in a manner to elevate their respective beams, though the converse of this arrangement may be employed, if desired. For angularly adjusting each such headlight 11 in an opposite angular direction, or in the present embodiment in a direction to lower its beam, there are employed suitable cam means, carried respectively by the headlight members 11 and by the vehicle body member 10, for operative engagement with each other. Such cam means on the vehicle body are exemplified by cams 23—23 affixed to a common cam shaft 24 for operative engagement with cam followers 25—25 which exemplify said cam means of the headlight members. These cam followers are affixed to the respective ring frames 17 at locations eccentrically displaced from the axis 18 about which the headlights are angularly adjusted. It will thus be seen that continued rotation of the cam shafts 24 and cams 23 will alternately urge the respective headlights 11 downwardly about their axis 18 and then permit their return upwardly by the action of their springs 20.

Cam shaft 24 is supported for rotation parallel to the aligned rotational axes 18 of the headlights 11, one end of the cam shaft 24 being journaled in a bearing 26 affixed to body 10 within the casing 15 as in FIGURE 2. Also, as shown in the same figure, the opposite end of the shaft 24 is rotatably journaled in a reduction gear housing 27 affixed to an electric driving motor 28 which, in turn, is rigidly affixed to the vehicle body 10 within the housing 15. The motor 28 exemplifies a small electric gear reduction motor, the output of which is through reduction gearing of conventional nature within the reduction gear box 27, the cam shaft 24 being operatively connected in driven relation to such reduction gearing to function in effect as the output shaft of the motor 28. It will be understood that the energizing circuit of the motor, exemplified diagrammatically at 30, and deriving its energy from the usual automobile battery 31, may be selectively energized and deenergized by means of a usual push button switch 32 mounted either on the dashboard of the truck or other convenient location.

In the operation of the structure illustrated in FIGURES 1, 2 and 3, it is to be understood that the conventional sealed beam headlights 11 are subjected to simultaneous control by a conventional dimer switch so that they may be optionally controlled to either raise or lower the projected light beams, without physically altering the positions of angular adjustment of the respective headlights 11. However the bodily angular positions of the respective headlights 11 may be readily varied to adapt them for proper adjustment to suit the particular loaded or unloaded condition of the vehicle, which condition will of course effect variations in the inclination of the vehicle body as a whole including the headlights. Thus, either raising or lowering the light beams of the respective headlights 11 may be effected by actuation of the control switch 32 to energize the drive motor 28 and rotate the cam shaft 24 at a low rate of speed through reduction bearing in gear box 27. Assuming that the cam shaft 24, as it appears in FIGURE 3, will be rotated in a counterclockwise direction, this will result in swinging the headlights to lower their respective beams as the lobes of the cams approach engagement with the cam followers 25, and as the lobes of the respective cams 23 thereafter recede from the followers 25, the return springs 20 will return the respective headlights to raise their beams. The motor 28 may be deenergized at such time as the headlights reach the desired adjustment, and it will be apparent that when the motor is thus deenergized and brought to a position of rest, its connection to the cam shaft 24 through the reduction gearing within the gear box 27 will act to maintain the cam shaft fixed in its position of adjustment until the motor 28 is again energized. Obviously the cams 23 need not necessarily have their lobes directed at the same angle from the shaft 24, but may be of varying shapes and out of phase or, in other words, angularly displaced from each other, as shown in FIGURE 3, to whatever extent may be desired in order to produce a difference between the elevational angles of the respective headlights at any given time.

In the modified embodiment of the invention illustrated in FIGURE 4, the headlights and their respective mounting means are identical with those disclosed in the preceding embodiment and identical parts are accordingly designated by similar reference characters. However, in place of the common cam shaft 24 and its associated driving motor as in the preceding embodiment, this modification employs separate motors 28′, each having its own reduction gearing 27′ for driving its individual cam shaft 24′, the cam shaft 24′ in this instance being quite short in length and thus readily supported and journaled by the reduction gear box 27′, with its associated cam 23′ affixed to such shaft for cooperation with the follower 25 of its respective headlight 11 in the same manner as in the preceding embodiment. It is to be understood that each of the individual motors 28′ in this embodiment may have its own individual control switch, such as the switch 32 in FIGURE 2, so that the two headlights 11—11 may have their elevations controlled individually. Also, the motors 28 or 28′ may be reversible so that the headlight beams may be partially raised to any desired extent and then immediately lowered, without necessity for first moving them to their maximum heights.

Having thus described my invention, I claim:

1. In a headlight structure for a vehicle, the combination of a pair of laterally spaced headlights disposed at the front end of the vehicle to direct their beams of light forwardly in the direction of travel of the vehicle, means supporting said headlights on the vehicle for vertical angular adjustment about laterally aligned horizontal axes, resilient means urging the respective headlights in a given angular direction about said axes, a cam shaft and means journaling same on the vehicle for rotation about an axis parallel to said laterally aligned axes, cam followers carried by the respective headlights eccentrically to their said laterally aligned axes, rotary cams affixed to said cam shaft for rotation therewith in operative engagement with the respective followers to oscillate said headlights angularly about their axes in opposition to said resilient means, and means for effecting unidirectional rotary movement of said cam shaft through repeated revolutions, said last-mentioned means being operative selectively to bring said cam shaft to rest in selective angular positions and to maintain it against rotation in said positions whereby to preserve the said adjustments of the headlights.

2. The headlight structure as defined in claim 1, in which said cams have portions of their operative cam surfaces relatively angularly displaced on the said cam shaft.

3. In a headlight structure for a vehicle, the combination of a headlight disposed at the front end of the vehicle to direct its beam of light forwardly in the direction of vehicle travel, means supporting said headlight on the vehicle for vertical angular adjustment about a horizontal axis extending laterally to said direction of travel, resilient means urging said headlight in a given angular direction about said axis, a cam shaft and means journaling same on the vehicle for rotation about a fixed axis, a cam follower carried by said headlight eccentrically to its said axis, a rotary cam affixed to the cam shaft for rotation therewith in operative engagement with the said follower to urge said headlight about its lateral axis in opposition to said resilient means, and selectively operative means for unidirectionally rotating said cam shaft through an angle in excess of 360 degrees and to a selected angular position to correspondingly change the angular adjustment of said headlight, and for thereafter maintaining said cam shaft against rotation in said position whereby to maintain the selected angular adjustment of the headlight.

References Cited by the Examiner

UNITED STATES PATENTS

| | | | |
|---|---|---|---|
| 1,611,267 | 12/1926 | Case | 240—61.9 |
| 2,719,217 | 9/1955 | Lemons | 240—61.8 |
| 2,754,411 | 7/1956 | Dohrmann | 240—61.9 |
| 2,824,215 | 2/1958 | Goff | 240—61.8 X |
| 3,177,355 | 4/1965 | Trowbridge | 240—7.1 |

FOREIGN PATENTS

| | | |
|---|---|---|
| 1,116,541 | 2/1956 | France. |

NORTON ANSHER, *Primary Examiner.*